(12) United States Patent  
Haraguchi et al.

(10) Patent No.: US 7,039,310 B2  
(45) Date of Patent: *May 2, 2006

(54) VIEWFINDER DISPLAY APPARATUS

(75) Inventors: Shosuke Haraguchi, Kanagawa (JP); Hiroshi Sakurai, Chiba (JP); Takanori Honda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/153,590

(22) Filed: Jun. 15, 2005

(65) Prior Publication Data

US 2005/0249490 A1 Nov. 10, 2005

Related U.S. Application Data

(62) Division of application No. 10/647,017, filed on Aug. 22, 2003, now Pat. No. 6,920,284.

(30) Foreign Application Priority Data

Aug. 26, 2002 (JP) ............................. 2002-245535  
Aug. 26, 2002 (JP) ............................. 2002-246011

(51) Int. Cl.  
*G03B 13/30* (2006.01)

(52) U.S. Cl. ....................... 396/147; 396/296
(58) Field of Classification Search ........ 396/121–123, 396/147, 150, 152, 296  
See application file for complete search history.

(56) References Cited

U.S. PATENT DOCUMENTS 6,920,284 B1 * 7/2005 Haraguchi et al. .......... 396/147

FOREIGN PATENT DOCUMENTS

| JP | H1(1989)-277225 | 11/1989 |
| JP | H4(1992)-278931 | 10/1992 |
| JP | H5(1993)-333259 | 12/1993 |
| JP | H08-43916 | 2/1996 |
| JP | H09-218440 | 8/1997 |
| JP | H09-236862 | 9/1997 |
| JP | H10(1998)-48733 | 2/1998 |
| JP | H11-014983 | 1/1999 |
| JP | H11-142631 | 5/1999 |
| JP | 2001-075149 | 3/2001 |

* cited by examiner

*Primary Examiner*—W. B. Perkey  
(74) *Attorney, Agent, or Firm*—Cowan, Liebowitz & Latman, P.C.

(57) ABSTRACT

A viewfinder display apparatus which can realize superimpose having good visibility without giving uncomfortable feeling to a photographer is disclosed. The viewfinder display apparatus includes an eyepiece lens unit, an a member on which illumination unit which irradiates illumination light, and a plurality of region display sections arranged in a viewfinder optical path respectively to correspond to the focus detection regions. Each of the region display sections includes an outer frame which partially transmits light from an object to display edges of the focus detection regions in the viewfinder field and reflecting region in which reflecting surface which reflects illumination light from the illumination unit to guide the reflected light to the eyepiece lens unit are formed.

9 Claims, 10 Drawing Sheets

VIEWFINDER DISPLAY APPARATUS

CROSS-REFERENCE TO RELATED APPLICATIONS

This application is a divisional of application Ser. No. 10/647,017, filed Aug. 22, 2003, now U.S. Pat. No. 6,920,284 the entire disclosure of which is hereby incorporated by reference.

BACKGROUND OF THE INVENTION

1. Field of the Invention

The present invention relates to a viewfinder display apparatus having a superimpose display function which displays a focus detection region selected from a plurality of focus detection regions set in a viewfinder field.

2. Description of the Related Art

A conventional camera having a superimpose display function which is proposed in Japanese Patent Application Laid-Open No. H01(1989)-277225 or Japanese Patent Application Laid-Open No. H05(1993)-333259 is known. In such a conventional camera, a flux of light emitted from an illumination unit arranged in front of a pentaprism is reflected by a quick return mirror constituted by a half mirror through a projection lens to illuminate a plurality of display units arranged on a focusing screen.

In a observing apparatus proposed in Japanese Patent Application Laid-Open No. H04(1992)-278931, an illumination unit is arranged in a frontal region of a pentaprism to cause illumination light emitted from the illumination unit to transmit through the pentaprism, so that a display body on the focusing screen is irradiated.

In addition, in an optical apparatus proposed in Japanese Patent Application Laid-Open No. H10(1998)-048733, a focusing point display section corresponding to a focusing point is set in an information display section in a viewfinder which displays a shutter speed and a aperture value.

However, in the camera disclosed in Japanese Patent Application Laid-Open No. H01(1989)-277225 or Japanese Patent Application Laid-Open No. H05(1993)-333259, an optical path extending from an illumination unit to a focusing screen is so long that a flux of light from the illumination unit is repeatedly refracted and reflected by a projection lens, a main mirror, or the like many times. Furthermore, since the main mirror is constituted by a half mirror, optical waveguide efficiency is considerably poor.

In addition, in the camera described above, an arrangement space for the projection lens or the like is required, and an adjusting operation for a flux of light emitted from the illumination unit must be performed. For this reason, the camera increases in size and cost to deteriorate the productivity.

On the other hand, when a focal point detection frame is entirely illuminated with LED light, although bright-light shooting can be performed without any problem, a section gleaming with the LED light adversely affects the display in the viewfinder field in photographing in the dark. For this reason, a photographer who looks into the viewfinder may bothersomely see the display in the viewfinder.

In the observing apparatus disclosed in Japanese Patent Application Laid-Open No. H04(1992)-278931, since light from the illumination unit illuminates a focusing screen through the pentaprism, the optical path becomes short, and optical waveguide efficiency is improved. However, since the illumination unit is arranged in the frontal region of the pentaprism, it is difficult to arrange a built-in flashlight-emitting unit in the frontal region of the pentaprism.

The display body on the focusing screen is constituted by a mirror surface, and does not transmit object light. For this reason, when an observer looks into the viewfinder, a part of an object image corresponding to the display body is blacked out. For example, when the display body on the focusing screen is formed in the shape of two lines, a cross, or the like, the observer is hard to see the object image depending on the shape of the display body.

In the optical apparatus disclosed in Japanese Patent Application Laid-Open No. H10(1998)-048733, since a focusing point display section corresponding to a focusing point is set in a conventional in-viewfinder information display section which displays a shutter speed and a aperture value outside a viewfinder field, a selected focusing point can be displayed without increasing cost. However, since the position of the focusing point display section is different from an actual focusing point displayed in the viewfinder field, the visibility of the focusing point is not up much.

SUMMARY OF THE INVENTION

It is an object of the present invention to provide a viewfinder display apparatus and a camera which can improve productivity by reducing cost and size and making adjustment of illumination light unnecessary and which can realize superimpose having good visibility without giving uncomfortable feeling to a photographer.

In order to achieve the above object, a viewfinder display apparatus which displays an optical image and which can display focus detection region comprises an eyepiece lens unit, an illumination unit which irradiates illumination light, and a member on which a region display section arranged in a viewfinder optical path. The region display section includes a square outer frame which seamlessly surrounds the focus detection region and a reflecting region which is surrounded by the outer frame and includes a reflecting surface reflecting illumination light from the illumination unit to guide the reflected light to the eyepiece lens unit.

The outer frame comprises a plurality of prisms. The viewfinder display apparatus includes a mirror unit which is arranged above the member at positions being adjacent to the eyepiece lens unit and which guides light from an object to the eyepiece lens unit. The illumination unit is arranged above the eyepiece lens unit.

The member is a focusing screen. The reflecting surface is subjected to a reflective deposition process. The reflecting region is smaller than region surrounded by the outer frame.

The reflecting surface is formed to have circular shape, and the diameter of the reflecting surface is smaller than 0.2 mm. The reflecting surfaces are a set of microscopic reflecting surfaces.

The reflecting region is arranged in the outer frame.

A camera according to the present invention includes the viewfinder display apparatus according to the present invention, and a mirror member which guides light from an object to the viewfinder display apparatus.

The characteristic features of the viewfinder display apparatus according to the present invention and the camera according to the present invention will be apparent from the following explanation of embodiments with reference to drawings.

DESCRIPTION OF THE PREFERRED EMBODIMENTS

First Embodiment

A camera according to the first embodiment of the present invention will be described below with reference to the accompanying drawings and the like.

Figure 1:
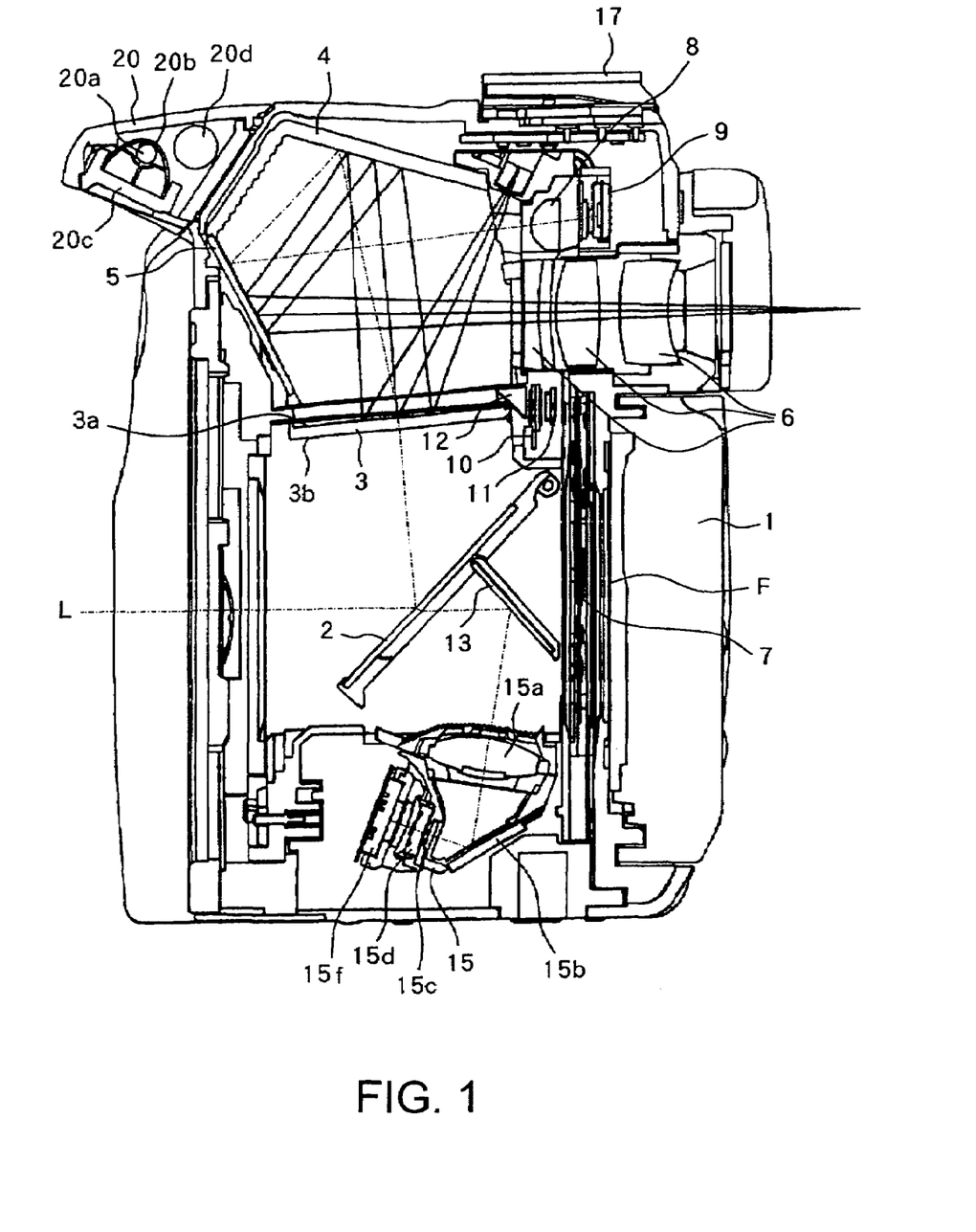
FIG. 1 is a longitudinal cross-sectional view of a camera according to this embodiment.

FIG. 1 is a longitudinal cross-sectional view of a camera according to this embodiment. Object light L transmitting through a photographing optical system (image-forming optical system) (not shown) is reflected by a main mirror (half mirror) 2 and then guided to a viewfinder optical system when the main mirror 2 is at an observing position (mirror-down position) as shown in FIG. 1. On the other hand, when the main mirror 2 is retreated from a photographing optical path, the object light L transmits through a focal plane shutter 7 and then forms an image on a film F. An image-pickup element such as CCD may be used instead of film.

A focusing screen 3 is arranged on a planned image-forming surface of the photographing optical system, and has an upper surface which is constituted by a mat surface 3a to project an object image. The lower side of the focusing screen 3 is constituted by a Fresnel surface 3b which converges object light. Seven focus detection regions are formed on the focusing screen 3 as will be described below.

A hollow penta mirror 4 and a third reflecting mirror 5 converts the object image projected on the focusing screen 3 into a correct image to guide the correct image to an eyepiece lens unit 6. A photographer can observe the object image through the eyepiece lens unit 6.

A known photometric lens 8 and a photometric sensor 9 for measuring an object luminance are arranged above the eyepiece lens unit 6. An in-viewfinder information display LCD 10 which is used to display photographing information outside a viewfinder field, an in-viewfinder information display LED 11, and a triangular prism 12 which is used to guide transmitted light from the LCD 10 are arranged under the eyepiece lens unit 6.

An illumination mechanism for superimpose display is arranged between the hollow penta mirror 4 and the photometric lens 8. The details of the illumination mechanism will be described below with reference to FIGS. 2 and 3.

A sub-mirror 13 is arranged on the back of the main mirror 2. This sub-mirror 13 reflects a flux of light transmitting through the main mirror 2 toward a focal point detection unit 15 arranged on the lower side of a camera body 1. The focal point detection unit 15 is constituted by a field lens 15a arranged near an image-forming surface, a reflecting mirror 15b, an aperture diaphragm 15c, a secondary image-forming lens 15d, and an AF sensor 15f.

Figure 5:
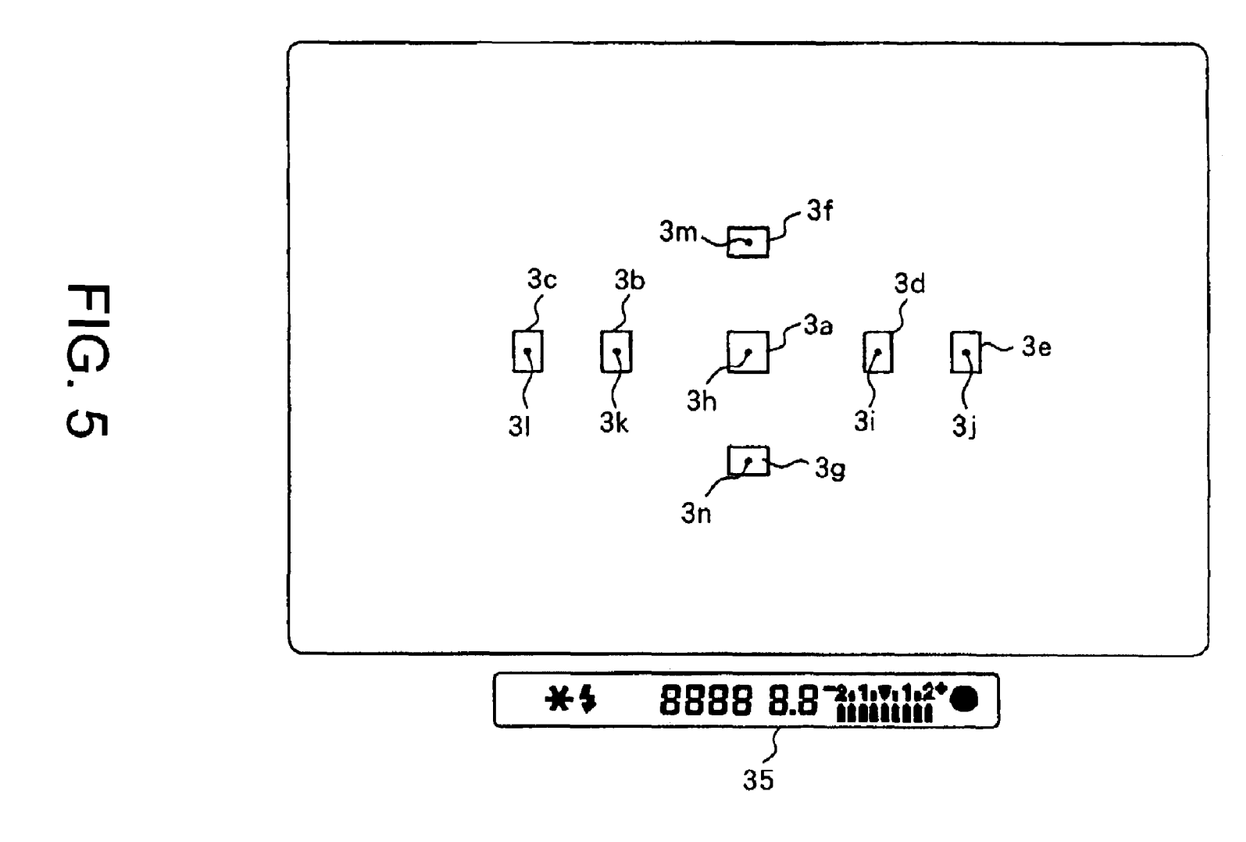
FIG. 5 is a view in a viewfinder field in the camera according to the first embodiment.

The focal point detection unit 15 in this embodiment, a focal point adjusting state is detected by using a known phase shift detection method. As shown in FIG. 5, a plurality of regions (seven) in an observed screen (in the viewfinder field) are set as focus detection regions.

An accessory shoe 17 is arranged on the upper surface of the camera body 1 immediately above a lens optical axis. A camera accessory such as an external flashlight emitting device is attached to the accessory shoe 17, so that the camera body 1 can mutual communicate with the flashlight emitting device.

A light-emitting unit 20 of the flashlight emitting device built in the camera body 1 is constituted by an Xe tube 20a which converts electric energy into optical energy, a reflecting umbrella 20b and a panel 20c which are used to efficiently converge light emitted from the Xe tube 20a onto an object side, and a trigger coil 20d which applies a voltage to the Xe tube 20a so that the light emitting starts.

The light-emitting unit 20 of the flashlight emitting device is accommodated in a frontal region of the hollow penta mirror 4 in an inactive state as shown in FIG. 1. In an active state, the light-emitting unit 20 is clockwise pivoted about a hinge shaft (not shown) in FIG. 1 and popped up above the camera body 1.

Figure 2:
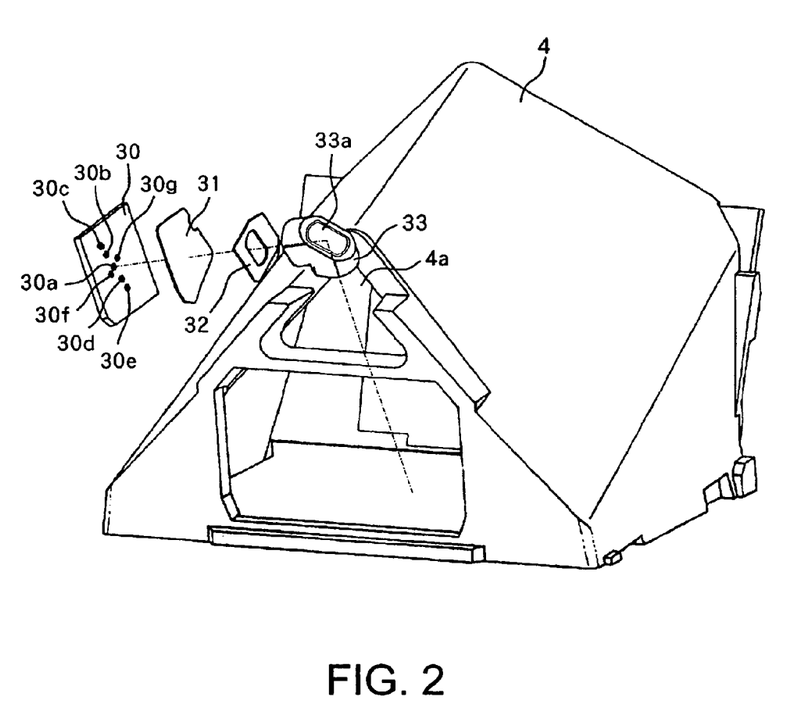
FIG. 2 is an exploded perspective view which explains an illumination system for superimposition in the camera according to this embodiment.

FIG. 2 is an exploded perspective view of an illumination mechanism for superimpose display according to this embodiment. An LED 30 for superimpose illumination is constituted by seven chip-type LEDs (a LED-C_30a, a LED-L1_30b, a LED-L2_30c, a LED-R1_30d, a LED-R2_30e, a LED-T_30f, and a LED-B_30g) which are arranged to correspond to seven focus detection regions formed on the focusing screen 3, respectively.

A diffusion plate 31 diffuses illumination light from the LED 30 for superimpose illumination to widen an illumination range, and functions to make it difficult to see the shadow or the like of a wire bonding formed in manufacturing of the LED 30 when an object is illuminated. An aperture diaphragm 32 represses ghost from being generated by unnecessary illumination light from the LED 30 for superimpose illumination.

A prism 33 for superimpose is subjected to a reflective deposition process on a reflecting surface 33a. The reflecting surface 33a reflects illumination light from the LED 30 to guide the illumination light from an opening portion 4a of the hollow penta mirror 4 into the hollow penta mirror 4. The illumination lights from the LEDs 30a to 30g are irradiated on the focus detection regions formed on the focusing screen 3.

The illumination light from the LED 30 is irradiated from the rear surface side of the camera body 1 onto the hollow penta mirror 4 as shown in FIG. 1, and the illumination light transmits through the hollow penta mirror 4 and is guided onto the focusing screen 3. With this configuration, since the optical path of the illumination light from the LED 30 is shortened, optical waveguide efficiency is improved.

Figure 3A:
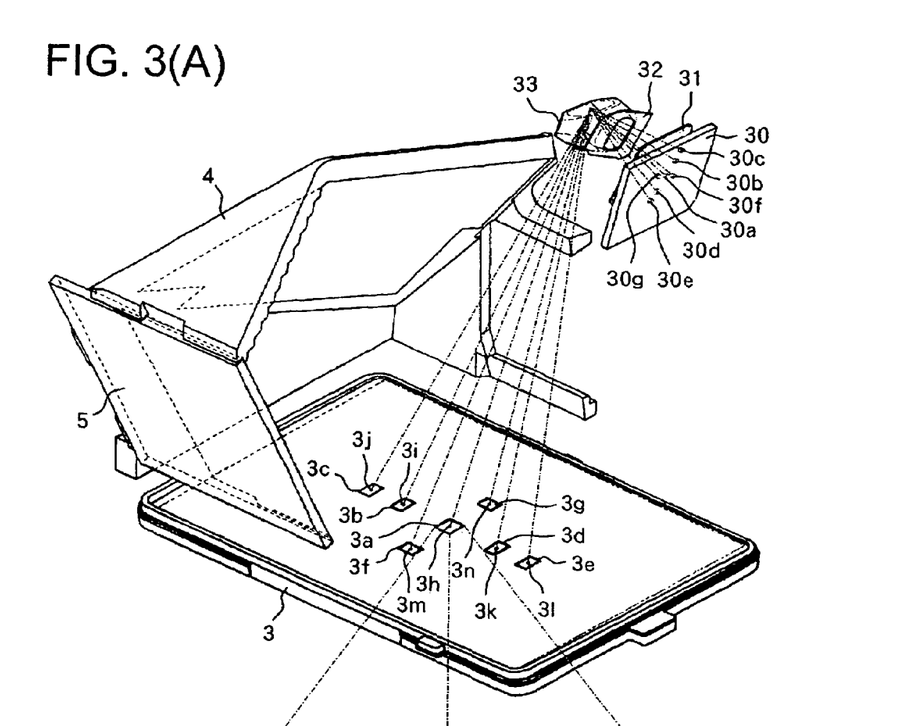
FIGS. 3(A) and 3(B) are perspective views in the camera according to a first embodiment and an enlarged view of a central focal point detection frame.
Figure 3B:
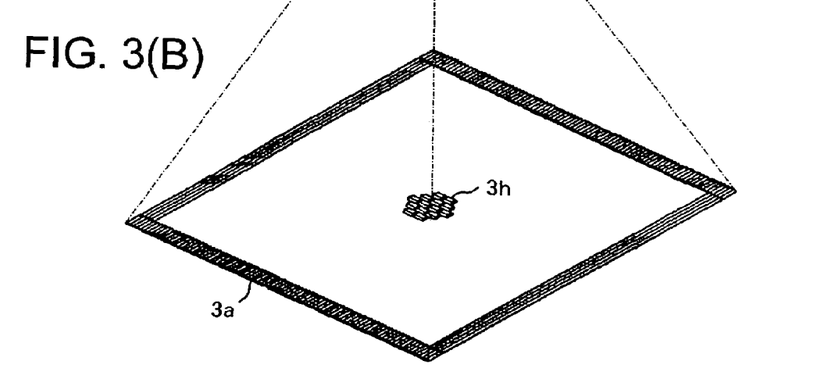

FIG. 3(A) is a perspective view showing a manner of actually illuminating the focal point detection frames of the focusing screen 3 with illumination light from the LED 30 for superimpose illumination. In FIG. 3(A), the hollow penta mirror 4 and the third reflecting mirror 5 are shown as cross sections obtained by cutting these mirrors at their centers, respectively. FIG. 3(B) shows a central focal point detection frame (outer frame) 3a formed at the center of the focusing screen 3 as an enlarged view.

In FIG. 3(A), the LED-C_30a illuminates the neighborhood of the central focal point detection frame 3a. Similarly, the LED-L1_30b illuminates the neighborhood of the left middle focal point detection frame 3b, the LED-L2_30c illuminates the neighborhood of the left focal point detection frame 3c, the LED-R1_30d illuminates the neighborhood of the right middle focal point detection frame 3d, the LED-R2_30e illuminates the neighborhood of the right focal point detection frame 3e, the LED-T_30f illuminates the neighborhood of the upper focal point detection frame 3f, and the LED-B_30g illuminates the neighborhood of the lower focal point detection frame 3g.

In this case, the illumination lights from the LEDs 30a to 30g comprehensively irradiate the focal point detection frames 3a to 3g, respectively, or irradiate the focal point detection frames 3a to 3g to cover all the focal point detection frames, respectively, so as to compensate for the displacement caused by manufacture tolerance.

The illumination lights from the LEDs 30a to 30g are reflected by reflecting regions 3h, 3i, 3j, 3k, 3l, 3m, and 3n arranged at the centers of the focal point detection frames 3a, 3b, 3c, 3d, 3e, 3f, and 3g, respectively. The reflected lights are observed through the hollow penta mirror 4, the third reflecting mirror 5, and the eyepiece lens unit 6.

Fundamentally, the LED 30 satisfactorily illuminates the small-area reflecting regions 3h to 3n formed in the focal point detection frames 3a to 3g. As described above, since the optical path of the illumination light from the LED 30 becomes short, the illumination system (the LED 30 or the like) can be reduced in size. In addition, since the reflecting regions 3h to 3n are arranged at the centers of the focal point detection frames 3a to 3g, respectively, the reflecting regions 3h to 3n can be reliably illuminated even though the illumination light from the LED 30 somewhat shifts from the target. For this reason, the illumination light from the LED 30 need not be adjusted.

As is apparent from the enlarged view shown in FIG. 3(B), the reflecting region 3h formed at the center of the central focal point detection frame 3a reflects the illumination light from the LED 30a for superimpose illumination such that the illumination light is guided to the eyes of a photographer through the hollow penta mirror 4 and the third reflecting mirror 5. The reflecting region 3h is constituted by a set of a plurality of microscopic reflecting surfaces 3hS having the same shapes. The microscopic reflecting surfaces 3hS are formed at predetermined angles with the surface of the focusing screen 3.

When one reflecting region is constituted by one surface, the reflecting region must be formed at the predetermined angle as described above. In this case, since a level difference between both ends of the reflecting region is considerably large, the reflective deposition process becomes ununiform to cause uneven brightness.

For this reason, as described in this embodiment, one reflecting region is constituted as a set of microscopic reflecting surfaces having equal reflection angles, so that the influence of the level difference described above is reduced. In this case, tilt angles of the microscopic reflecting surfaces formed at the centers of the focal point detection frames with respect to the focusing screen 3 are optimally set such that a photographer can preferably see lights reflected by the microscopic reflecting surfaces.

The prism edge lines of the focal point detection frames 3a to 3g are formed in almost parallel to the illumination light from the LED 30 so that the reflected light components which are generated by the focal point detection frames 3a to 3g are not directed towards the eyepiece lens unit (eyes of a photographer). In this manner, when object light has low luminance (when an observing environment is dark), all the focal point detection frames do not reflect light to the eyepiece lens unit, and only the reflecting regions 3h to 3n arranged at the centers of the focal point detection frames 3a to 3g reflect light to the eyepiece lens unit. For this reason, unlike the conventional technique, a photographer does not feel unpleasant in the viewfinder by increasing the number of reflected light components.

Figure 4A:
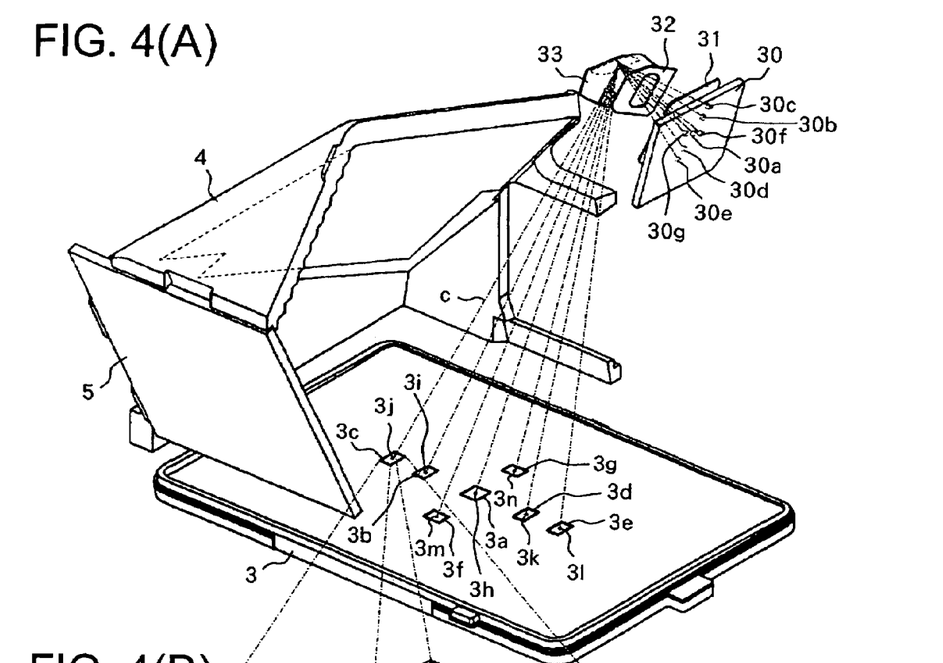
FIGS. 4(A) and 4(B) are perspective views in the camera according to the first embodiment and an enlarged view of a left focal point detection frame.
Figure 4B:
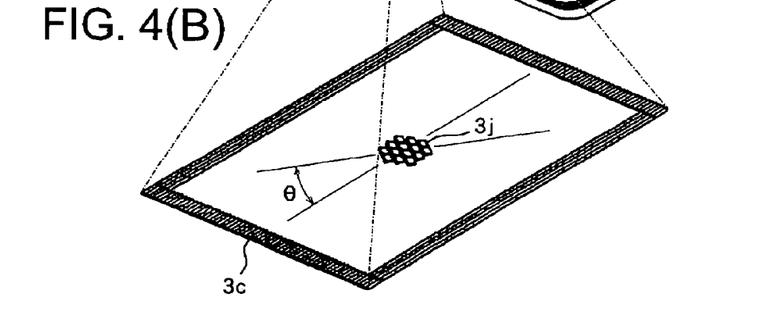

Like FIG. 3(A), FIG. 4(A) shows a manner of illuminating the focal point detection frames of the focusing screen 3 by the LED 30 for superimpose illumination. FIG. 4(B) shows the left focal point detection frame 3c located on the left (because the image is horizontally reversed by the hollow penta mirror 4) in view of a photographer who looks into the viewfinder as an enlarged view. The same reference numerals as in FIG. 3 denote the same parts in FIG. 4.

As is apparent from the enlarged view shown in FIG. 4(B), the reflecting region 3j formed at the center of the left focal point detection frame 3c reflects the illumination light from the LED 30c for superimpose illumination such that the illumination light is guided to the eyes of a photographer through the hollow penta mirror 4 and the third reflecting mirror 5. The reflecting region 3j is constituted by a set of a plurality of microscopic reflecting surfaces having the same shapes like the reflecting region 3h. The microscopic reflecting surfaces are formed at predetermined angles with the surface of the focusing screen 3.

However, the reflecting region 3j of the left focal point detection frame 3c is different from the reflecting region 3h of the central focal point detection frame 3a in that the reflecting region 3j is inclined at an angle 9 with the longitudinal direction of the left focal point detection frame 3c. The illumination light from the LED 30c for superimpose illumination is substantially perpendicular to the longitudinal direction of the microscopic reflecting surfaces.

When the microscopic reflecting surfaces in the reflecting regions of the focal point detection frames which are formed on the left and right of the viewfinder optical axis (central focal point detection frame 3a) are to be arranged in horizontal and vertical alignments like the reflecting region 3h of the central focal point detection frame 3a, the microscopic reflecting surfaces must be inclined along with the two axes to guide the illumination light from the LED 30 to the eyes of a photographer. When the microscopic reflecting surfaces are inclined along the two axes in this manner, the shapes of the reflecting surfaces in the reflecting region are different from each other, and the reflecting regions changes in size depending on the positions of the focal point detection frames to cause uneven brightness.

In order to this drawback, in this embodiment, the reflecting regions of the focal point detection frames formed on the left and right of the viewfinder optical axis (central focal point detection frame 3a) are inclined at an angle θ with the longitudinal direction of the focal point detection frames. In this manner, when the angle of only the one axis is optimally changed, the illumination light from the LED 30 can be correctly guided to the eyes of the photographer, and the reflecting regions of the focal point detection frames can be repressed from varying in size.

FIG. 5 is a viewfinder screen in the camera according to this embodiment. Seven focal point detection frames 3a, 3b, 3c, 3d, 3e, 3f, and 3g corresponding to focus detection regions of a focal point detection unit 15 are displayed in viewfinder screen.

Since a photographer consequentially see the focal point detection frames 3a to 3g on the focusing screen 3 through the hollow penta mirror 4 and the third reflecting mirror 5, the focal point detection frames 3a to 3g observed on the viewfinder screen are arranged at positions obtained by horizontally reversing the positions of the focal point detection frames 3a to 3g in FIG. 3.

The illumination light from the LED 30 for superimpose illumination is projected to the reflecting regions 3h, 3i, 3j, 3k, 3l, 3m, and 3n in the focal point detection frames such that a flux of light from the LED 30 cover these regions and does not illuminate the reflecting regions of the focal point detection frames arranged around one focal point detection frame.

The prism edge lines of the focal point detection frames 3a to 3g are formed in almost parallel to the optical axis of the illumination light from the LED 30 such that the prisms constituting the focal point detection frames 3a to 3g are repressed from unnecessarily reflecting excessive light of the illumination light from the LED 30 for superimpose illumination.

Since the prisms of the focal point detection frames 3a to 3g partially transmit an object light L, the object light L transmitting through the prisms is observed by a photographer as light which is in a half transmission state and which is darker than the object light L transmitting through the mat sections around the focal point detection frames on the focusing screen 3. In this manner, the photographer can discriminates the focal point detection frames 3a to 3g from each other in the viewfinder screen.

On the other hand, the surfaces of the reflecting regions 3h to 3n arranged at the centers of the focal point detection frames 3a to 3g are subjected to a reflective deposition process using a metal such as aluminum or chromium. For this reason, the reflecting regions 3h to 3n rarely transmit the object light L. Therefore, the reflecting regions 3h to 3n are recognized as small black dots in the viewfinder screen.

In this manner, when a photographer looks into the viewfinder to observes a normal object image without a superimpose display, the reflecting regions 3h to 3n are only recognized as black dots as described above. For this reason, unlike a conventional technique, the photographer is not hard to see the object image.

The reflecting regions 3h to 3n must be easily recognized by a photographer who looks into the viewfinder when illumination light from the LED 30 is reflected by the reflecting regions 3h to 3n. When the photographer observes the object image in a normal state, the reflecting regions 3h to 3n must be arranged not to interrupt the observation. Therefore, the sizes of the reflecting regions 3h to 3n must satisfy the above conditions. More specifically, the reflecting regions 3h to 3n preferably have sizes of less than Ø0.2 mm each.

In FIG. 5, an in-viewfinder information display section 35 which displays necessary information such as a shutter speed, a aperture value, and display showing that an electric charge of the flashlight-emitting unit has been competed related to photographing is arranged under the viewfinder screen.

Figure 6:
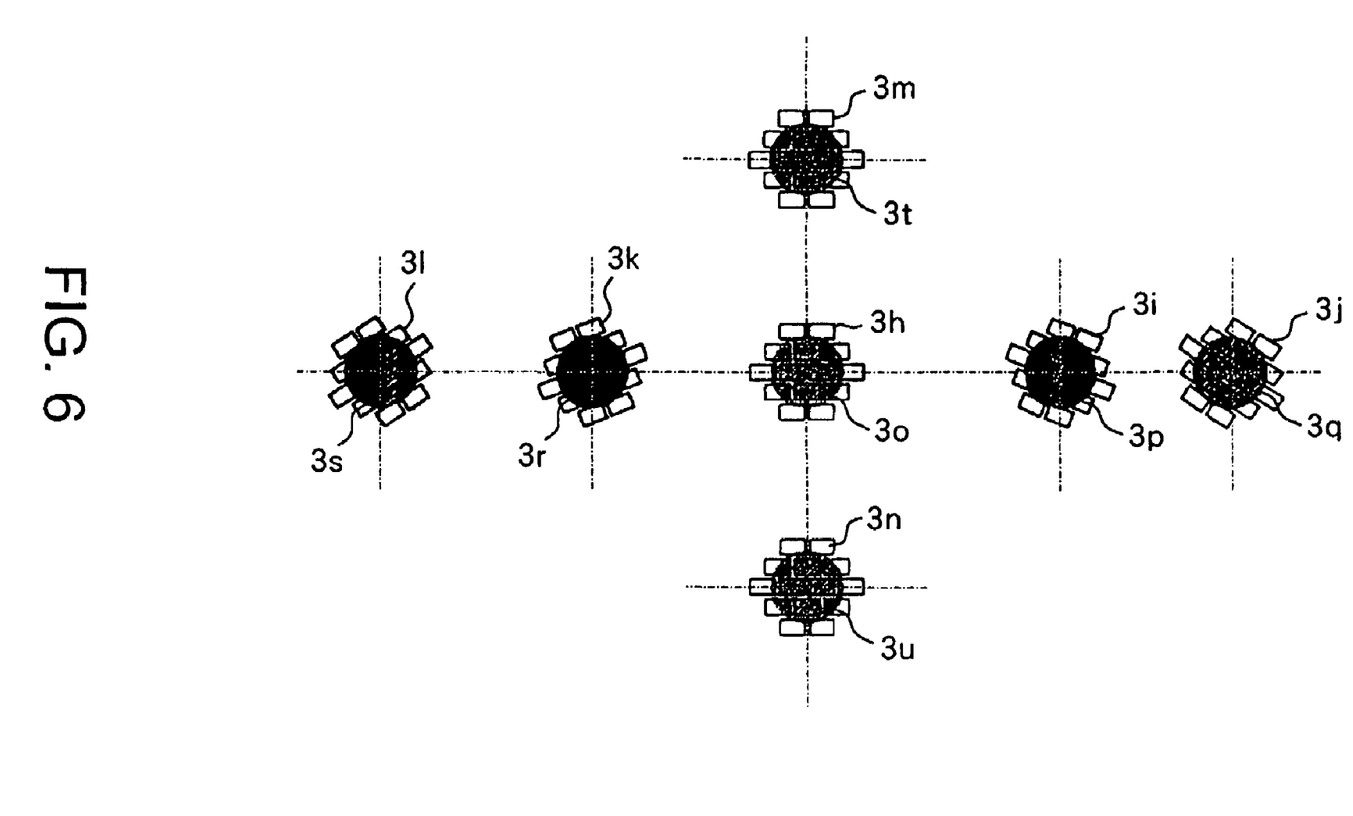
FIG. 6 is an enlarged view of a reflecting region in this embodiment.

FIG. 6 is a view selectively showing only the seven reflecting regions 3h to 3n at the centers of the focal point detection frames 3a to 3g.

In the reflecting regions 3h to 3n, microscopic reflective surfaces each having a size: 40 μm (horizontal)×25 μm (vertical) are arranged in a staggered pattern to enclose circles each having a size of less than ϕ0.2 mm. In the reflecting regions 3h to 3n, circular regions 3o, 3p, 3q, 3r, 3s, 3t, and 3u (indicated by hatched areas in FIG. 6) which can be accommodated in the reflecting regions 3h to 3n, respectively, are subjected to a reflective deposition process using a metal.

When illumination light from the LED 30 is irradiated on the reflecting regions 3h to 3n, the illumination light is reflected by the circular regions 3o to 3u subjected to the reflective deposition process.

In this case, the regions subjected to the reflective deposition process have circular shapes for the following reason. That is, as described in FIG. 4, in the focal point detection frames located on the left and right of the finder optical axis (central focal point detection frame 3a), since the reflecting regions are inclined at the predetermined angle θ with the longitudinal direction of the focal point detection frames, the circular shapes are employed to minimize the variation in reflecting surface shapes of the reflecting regions 3h to 3n.

Although the circular regions 3o to 3u are subjected to the deposition process, the deposition metal wraps around the mask. For this reason, in order to minimize disturbance of the shapes of the deposition regions, the deposition regions preferably have circular shapes.

On the other hand, since the areas of the circular regions 3o to 3u are slightly smaller than those of the reflecting regions 3h to 3n, respectively, the displacements of the deposition regions can be permitted when the deposition process is performed to the reflecting regions 3h to 3n.

Figure 7:
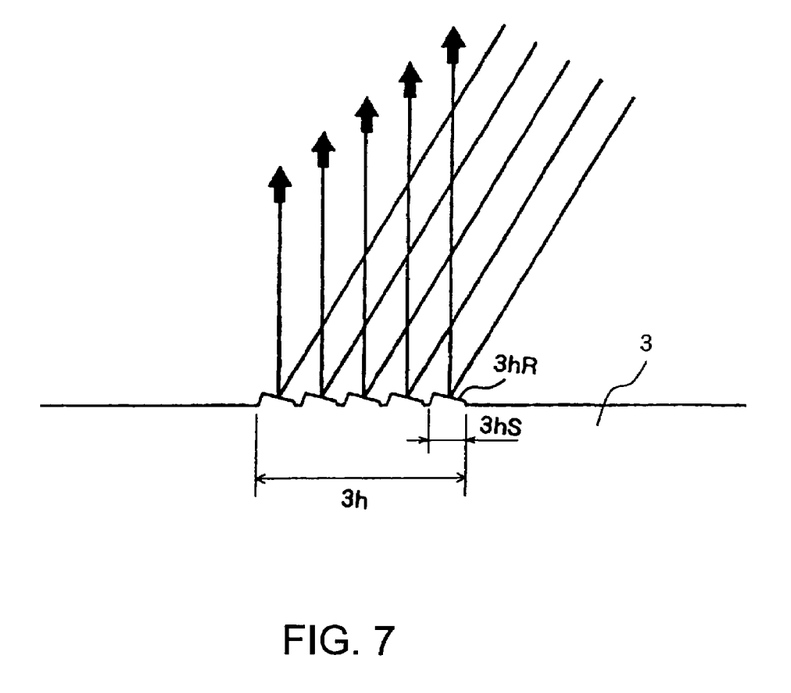
FIG. 7 is a longitudinal cross-sectional enlarged view of a reflecting region of a central focal point detection frame in this embodiment.

FIG. 7 is a longitudinal cross-sectional enlarged view of the reflecting region 3h. The reflecting region 3h is formed as a set of the microscopic reflecting surfaces 3hS having the same shapes as described above. An inclined surface 3hR which is inclined with respect to the surface of the focusing screen 3 functions as an actual reflecting surface, and the tilt angle of the inclined surface 3hR is such an angle that a flux of light emitted from the LED 30 for superimpose illumination is guided to the eyes of a photographer (the eyepiece lens unit 6 in FIG. 1).

In this embodiment, the reflecting regions 3h to 3n are arranged at the centers of the focal point detection frames 3a to 3g, respectively. However, the reflecting regions 3h to 3n may be positioned within the focal point detection frames 3a to 3g, respectively.

Second Embodiment

A viewfinder display apparatus according to the second embodiment of the present invention will be described below.

Figure 8A:
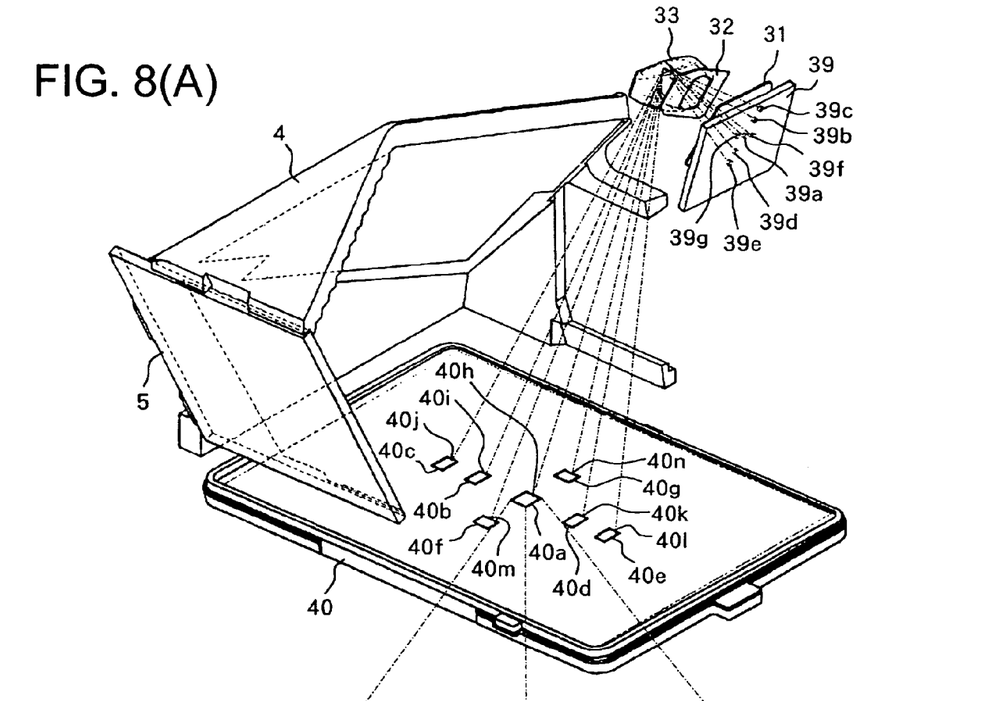
FIGS. 8(A) and 8(B) are perspective views in a second embodiment and an enlarged view of a central focal point detection frame.

FIG. 8(A) shows a manner of actually illuminating the focal point detection frames on the focusing screen 40 with illumination light from an LED 39 for superimpose illumination in the viewfinder display apparatus according to this embodiment. In FIG. 8(A), a hollow penta mirror 4 and a third reflecting mirror 5 are shown as cross sections obtained by cutting these mirrors at their centers, respectively. FIG.

Figure 8B:
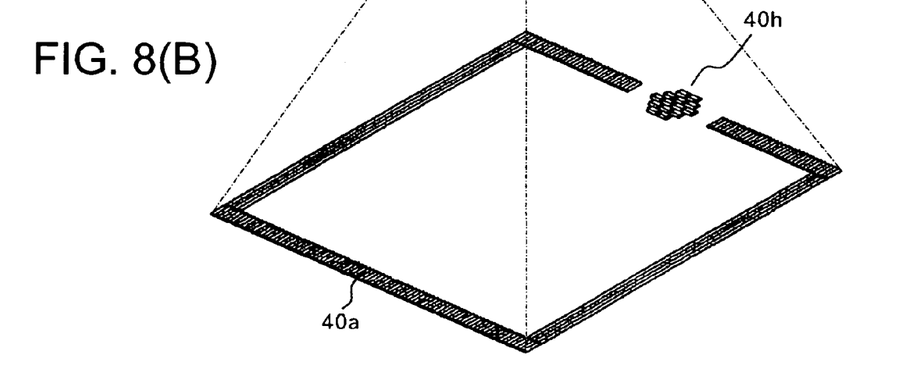

8(B) shows a central focal point detection frame 40a formed at the center of the focusing screen 40 as an enlarged view.

n FIG. 8(A), the LED-C_39a illuminates the neighborhood of the central focal point detection frame 40a. Similarly, the LED-L1_39b illuminates the neighborhood of the left middle focal point detection frame 40b, the LED-L2_39c illuminates the neighborhood of the left focal point detection frame 40c, the LED-R1_39d illuminates the neighborhood of the right middle focal point detection frame 40d, the LED-R2_39e illuminates the neighborhood of the right focal point detection frame 40e, the LED-T_39f illuminates the neighborhood of the upper focal point detection frame 40f, and the LED-B_39g illuminates the neighborhood of the lower focal point detection frame 40g.

In this case, the illumination lights from the LEDs 39a to 39g comprehensively irradiate the focal point detection frames 40a to 40g, respectively, or irradiate the focal point detection frames 40a to 40g to cover all the focal point detection frames, respectively, so as to compensate for the displacement caused by manufacture tolerance.

One of the frame lines of each of the focal point detection frames 40a, 40b, 40c, 40d, 40e, 40f, and 40g is cut. In the cut regions of the focal point detection frames 40a, 40b, 40c, 40d, 40e, 40f, and 40g, reflecting regions 40h, 40i, 40j, 40k, 40l, 40m, and 40n are arranged, respectively.

Illumination lights from the LEDs 39a to 39g are reflected by reflecting regions 40h, 40i, 40j, 40k, 40l, 40m, and 40n, respectively. The reflected lights are observed through the hollow penta mirror 4, the third reflecting mirror 5, and an eyepiece lens unit 6.

The LED 39 satisfactorily illuminates the small-area reflecting regions 40h to 40n formed in the focal point detection frames 40a to 40g. As in the first embodiment, since the optical path of the illumination light from the LED 39 becomes short, the illumination system (the LED 39 or the like) can be reduced in size. In addition, since the reflecting regions 40h to 40n are arranged at the centers of the cut regions of the focal point detection frames 40a to 40g, respectively, the reflecting regions 40h to 40n can be reliably illuminated even though the illumination light from the LED 39 somewhat shifts from the target. For this reason, the illumination light from the LED 39 need not be adjusted.

As is apparent from the enlarged view shown in FIG. 8(B), the reflecting region 40h is formed on the extension line of the cut frame line of the central focal point detection frame 40a. The reflecting region 40h reflects the illumination light from the LED 39a for superimpose illumination to guide the illumination light to the eyes of a photographer (the eyepiece lens unit 6 as shown in FIG. 1) through the hollow penta mirror 4 and the third reflecting mirror 5.

Figure 9:
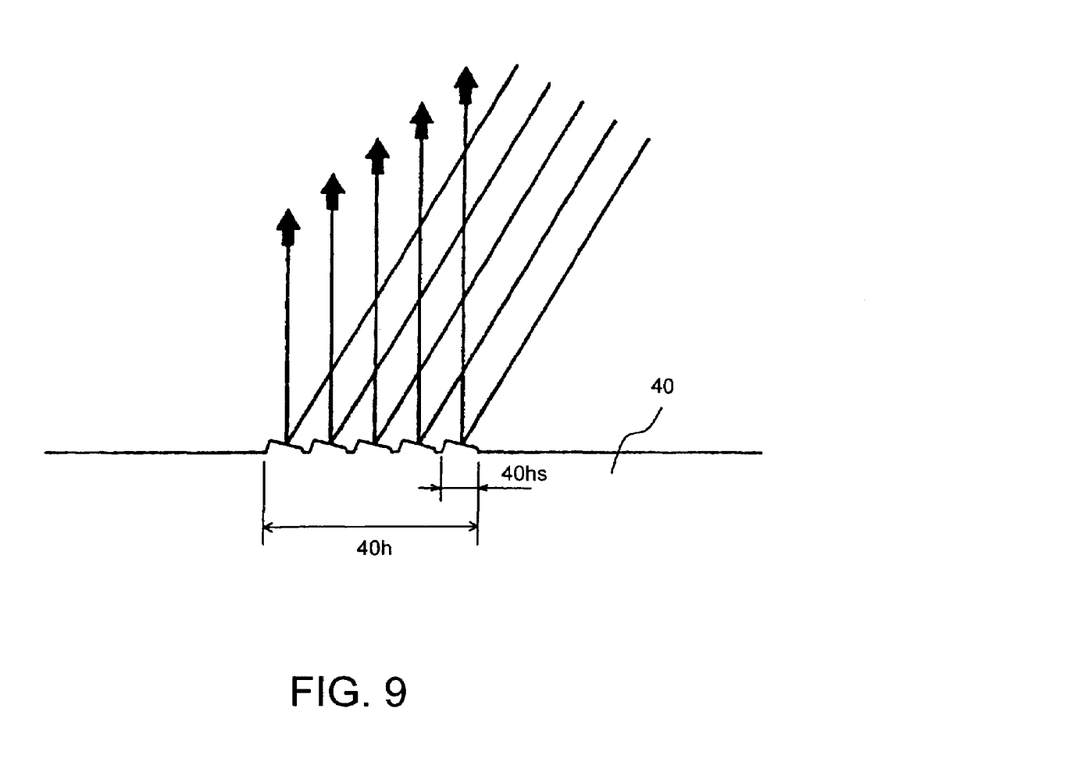
FIG. 9 is a longitudinal cross-sectional enlarged view of a reflecting region of a central focal point detection frame in this embodiment.

The reflecting region 40h is constituted by a set of a plurality of microscopic reflecting surfaces 40hS having the same shapes (FIG. 9). The microscopic reflecting surfaces 40hS are formed at a predetermined angle with the surface of the focusing screen 40.

When the reflecting region is constituted wholly by one surface, the reflecting region must be formed at the predetermined angle as described above. In this case, since a level difference between both ends of the reflecting region is considerably large, the reflective deposition process becomes ununiform to cause uneven brightness (will be described later).

For this reason, as described in this embodiment, one reflecting region is constituted as a set of microscopic reflecting surfaces having equal reflection angles, so that the influence of the level difference described above is reduced.

In this case, tilt angles of the microscopic reflecting surfaces formed on one sides of the focal point detection frames with respect to the focusing screen 40 are optimally set such that a photographer can preferably see lights reflected by the microscopic reflecting surfaces.

The prism edge lines of the focal point detection frames are formed in almost parallel to the illumination light from the LED 39 so that the reflected light components which are generated by the focal point detection frames are not directed towards the eyepiece lens unit. In this manner, when object light has low luminance (when an observing environment is dark), all the focal point detection frames do not reflect light to the eyepiece lens unit, and only the reflecting regions 40h to 40n arranged at the centers of the cut regions of the focal point detection frames 40a to 40g reflect light to the eyepiece lens unit. For this reason, unlike the conventional technique, a photographer does not feel unpleasant in the viewfinder by increasing the number of reflected light components.

Figure 10:
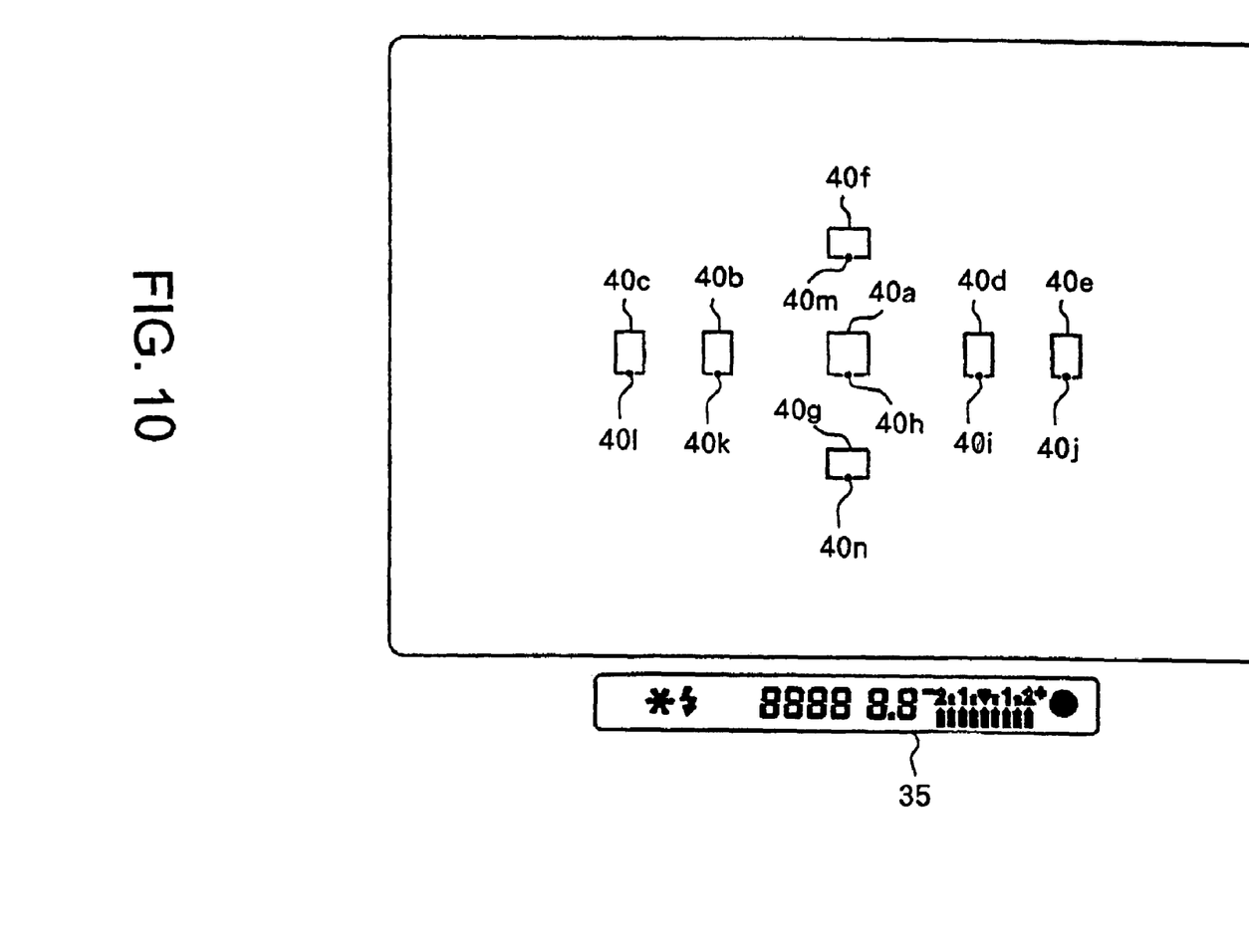
FIG. 10 is a view in a viewfinder field in the camera according to the second embodiment.

FIG. 10 is a viewfinder screen in the camera according to this embodiment. Seven focal point detection frames 40a, 40b, 40c, 40d, 40e, 40f, and 40g corresponding to focus detection regions of a focal point detection unit 15 are displayed in the finder screen.

Since a photographer consequentially see the focal point detection frames 40a to 40g on the focusing screen 40 through the hollow penta mirror 4 and the third reflecting mirror 5, the focal point detection frames 40a to 40g observed on the viewfinder screen are arranged at positions obtained by horizontally reversing the positions of the focal point detection frames 40a to 40g in FIG. 8.

The illumination light from the LED 39 for superimpose illumination is projected to the reflecting regions 40h, 40i, 40j, 40k, 40l, 40m, and 40n in the focal point detection frames to cover these regions such that a flux of light from the LED 39 does not illuminate the reflecting regions of the focal point detection frames arranged around one focal point detection frame.

The prism edge lines of the focal point detection frames 40a to 40g are formed in almost parallel to the optical axis of the illumination light from the LED 39 such that the prisms constituting the focal point detection frames 40a to 40g are repressed from unnecessarily reflecting excessive light of the illumination light from the LED 39 for superimpose illumination to the eyepiece lens unit.

Since the prisms of the focal point detection frames 40a to 40g partially transmit an object light L, the object light L transmitting through the prisms is observed by a photographer as light which is in a half transmission state and which is darker than the object light L transmitting through the mat sections around the focal point detection frames on the focusing screen 40. In this manner, the photographer can discriminates the focal point detection frames 40a to 40g from each other on the viewfinder screen.

On the other hand, the surfaces of the reflecting regions 40h to 40n arranged on one sides of the frame edges of the focal point detection frames 40a to 40g are subjected to a reflective deposition process using a metal such as aluminum or chromium. For this reason, the reflecting regions 40h to 40n rarely transmit the object light L. Therefore, the reflecting regions 40h to 40n are recognized as small black dots in the viewfinder screen.

In this manner, when a photographer looks into the viewfinder and observers a normal object image without a superimpose display, the reflecting regions 40h to 40n are only recognized as black dots as described above. For this reason, unlike a conventional technique, the photographer is not hard to see the object image.

The reflecting regions 40h to 40n must be easily recognized by a photographer who looks into the viewfinder when illumination light from the LED 39 is reflected by the reflecting regions 40h to 40n. When the photographer observes the object image in a normal state, the reflecting regions 40h to 40n must be arranged not to interrupt the observation. Therefore, the sizes of the reflecting regions 40h to 40n must satisfy the above conditions. More specifically, the reflecting regions 40h to 40n preferably have sizes of less than Ø0.2 mm each. More desirably, the sizes are Ø0.1 mm or more each.

In FIG. 10, an in-viewfinder information display section 35 which displays necessary information such as a shutter speed, a aperture value, and a display showing that an electric charge of the flashlight-emitting unit has been completed related to photographing is arranged under the viewfinder screen.

In this embodiment, some of the frame lines of the focal point detection frames 40a to 40g are cut, and the reflecting regions 40h to 40n are arranged in the cut regions, respectively. The photographer who looks into the viewfinder can observe the focal point detection frames 40a to 40g and reflecting regions 40h to 40n as one frame. For this reason, the photographer can observe an object image without uncomfortable feeling in normal viewfinder observation.

The present invention is not limited to the above embodiments. In the embodiments, the reflecting regions are directly formed on the focusing screen. However, a reflecting plate having a reflecting surface region is independently arranged near the focusing screen to reflect light from an LED for superimpose to the eyes of a photographer, so that the reflection of the reflecting plate may be used.

According to the present invention, illumination light is reflected by dot-like reflecting regions formed in focusing point detection regions (in regions surrounded by frame line regions) to guide reflected light to the eyes of a photographer, so that visibility in the viewfinder field is improved.

More specifically, when superimpose display of a selected focus detection region is performed, only dot-like reflecting regions are caused to flicker at a high luminescence to make it possible to cause a photographer to recognize a selected focus detection region. When an object image is observed in a normal state without superimpose display, only dot-like reflecting regions are blacked out to make it possible that a photographer is repressed from being hard to see the object image.

What is claimed is:

1. A viewfinder display apparatus which displays an optical image and which can display focus detection region, comprising:

an eyepiece lens unit;

an illumination unit which irradiates illumination light; and a member on which a region display section arranged in a viewfinder optical path, wherein the region display section includes a square outer frame which seamlessly surrounds the focus detection region and a reflecting region which is surrounded by the outer frame and includes a reflecting surface reflecting illumination light from the illumination unit to guide the reflected light to the eyepiece lens unit.

2. A viewfinder display apparatus according to claim 1, wherein the outer frame comprises a plurality of prisms.

3. A viewfinder display apparatus according to claim 1, further comprising a mirror unit which is arranged above the member at positions being adjacent to the eyepiece lens unit and which guides light from an object to the eyepiece lens unit, and wherein the illumination unit is arranged above the eyepiece lens unit.

4. A viewfinder display apparatus according to claim 1, wherein the member is a focusing screen.

5. A viewfinder display apparatus according to claim 1, wherein the reflecting surface is subjected to a reflective deposition process.

6. A viewfinder display apparatus according to claim 1, wherein, the reflecting surface is smaller than region surrounded by the outer frame.

7. A viewfinder display apparatus according to claim 1, wherein the reflecting surface is formed to have circular shape, and the diameter of the reflecting surface is smaller than 0.2 mm.

8. A viewfinder display apparatus according to claim 1, wherein the reflecting surface is a set of microscopic reflecting surfaces.

9. A camera comprising:

the viewfinder display apparatus according to claim 1; and a mirror member which guides light from an object to the viewfinder display apparatus.

* * * * *

UNITED STATES PATENT AND TRADEMARK OFFICE
CERTIFICATE OF CORRECTION

| | | |
|---|---|---|
| PATENT NO. | : 7,039,310 B2 | Page 1 of 1 |
| APPLICATION NO. | : 11/153590 | |
| DATED | : May 2, 2006 | |
| INVENTOR(S) | : Shosuke Haraguchi et al. | |

It is certified that error appears in the above-identified patent and that said Letters Patent is hereby corrected as shown below:

Column 6, line 44 delete "angle 9" and insert --angle θ--

Column 9, line 3, delete "n FIG 8(A)" and insert --In FIG 8(A)--

Signed and Sealed this

Fifth Day of June, 2007

JON W. DUDAS
*Director of the United States Patent and Trademark Office*